(12) United States Patent
Hanaoka et al.

(10) Patent No.: US 12,132,320 B2
(45) Date of Patent: Oct. 29, 2024

(54) POWER MANAGEMENT APPARATUS, POWER MANAGEMENT METHOD AND PROGRAM

(71) Applicant: Nippon Telegraph and Telephone Corporation, Tokyo (JP)

(72) Inventors: Naoki Hanaoka, Musashino (JP); Hidetoshi Takada, Musashino (JP); Toshihiro Hayashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 252 days.

(21) Appl. No.: 17/778,223

(22) PCT Filed: Nov. 22, 2019

(86) PCT No.: PCT/JP2019/045866
§ 371 (c)(1),
(2) Date: May 19, 2022

(87) PCT Pub. No.: WO2021/100207
PCT Pub. Date: May 27, 2021

(65) Prior Publication Data
US 2022/0407315 A1    Dec. 22, 2022

(51) Int. Cl.
*H02J 3/38* (2006.01)
*H02J 3/00* (2006.01)
*H02J 3/32* (2006.01)

(52) U.S. Cl.
CPC .............. *H02J 3/381* (2013.01); *H02J 3/003* (2020.01); *H02J 3/32* (2013.01); *H02J 2300/20* (2020.01)

(58) Field of Classification Search
CPC .... H02J 3/381; H02J 3/003; H02J 3/32; H02J 2300/20
See application file for complete search history.

(56) References Cited

U.S. PATENT DOCUMENTS

| 2014/0025218 A1* | 1/2014 | Nishi | H02J 3/28 700/295 |
| 2018/0240201 A1* | 8/2018 | Eda | G06Q 40/04 |
| 2018/0241208 A1 | 8/2018 | Eda et al. | |

FOREIGN PATENT DOCUMENTS

| JP | 2017153276 | 8/2017 |
| JP | 2019103165 | 6/2019 |

OTHER PUBLICATIONS

Minister of the Environment, "Advanced CO2 emission reduction measures model business for public facilities, etc.," env.go.jp, retrieved on Nov. 11, 2019, retrieved from URL <https://www.env.go.jp/earth/shisaku7-14.pptx>, 25 pages (with English Translation).

* cited by examiner

*Primary Examiner* — Carlos Amaya

(74) *Attorney, Agent, or Firm* — Fish & Richardson P.C.

(57) ABSTRACT

Disclosed is a power management device including a monitoring unit configured to monitor power usage statuses of a plurality of sites individually, a determination unit configured to determine whether to supply the surplus power to a second site of the plurality of sites when the monitoring unit detects that surplus power is generated in a first site of the plurality of sites in accordance with a prediction of a power transmission loss between the first site and the second site, and a site control unit configured to instruct the first site to supply the surplus power to the second site when the determination unit determines that the surplus power is to be supplied to the second site.

8 Claims, 12 Drawing Sheets

POWER MANAGEMENT APPARATUS, POWER MANAGEMENT METHOD AND PROGRAM

CROSS-REFERENCE TO RELATED APPLICATIONS

This application is a National Stage application under 35 U.S.C. § 371 of International Application No. PCT/JP2019/045866, having an International Filing Date of Nov. 22, 2019, the disclosure of which is considered part of the disclosure of this application, and is incorporated in its entirety into this application.

TECHNICAL FIELD

The present invention relates to a technique for interchanging power between sites.

BACKGROUND ART

Many sites such as data centers and telecommunications buildings not only receive power from commercial power sources via an electric power transmission and distribution grid to supply power to consuming equipment but also use power generated by power generation units with photovoltaic (PV) generation or the like provided in the sites.

NPL 1 discloses a technique by which power generation units with photovoltaic generation or the like (renewable energy facility) are provided in a plurality of public facilities, and the public facilities are connected to each other with a self-owned line (a power grid prepared separately from the electric power transmission and distribution grid) to interchange power generated by the power generation units between the public facilities.

CITATION LIST

Non Patent Literature

NPL 1: Advanced CO2 emission reduction model business for public facilities (H30 Ministry of the Environment), https://www.env.gojp/earths/shisaku7-14.pptx, Internet, Searched on Nov. 11, 2019

SUMMARY OF THE INVENTION

Technical Problem

When the power generated by the power generation unit in the site exceeds the power consumed by the consuming equipment, and thus surplus power is generated, it is common to return the power to the electric power transmission and distribution grid (also referred to as a system) by a reverse power flow. Unfortunately, depending on a state of the electric power transmission and distribution grid, the returned power may not be effectively utilized.

It is also conceivable to supply the power at a site in which surplus power has been generated, to another site by connecting the sites with self-owned lines. However, when surplus power is transmitted from a certain site to another site on a self-owned line, a power transmission loss occurs in proportion to a power transmission distance. Thus, depending on the power transmission distance or the like, the transmitted surplus power may be reduced due to the power transmission loss, and thus it may not be possible to effectively use the transmitted power on another site.

The present invention has been made in view of the above circumferences, and an object of the present invention is to provide a technique capable of effectively using surplus power generated in a site including a power generation unit.

Means for Solving the Problem

According to the disclosed technique, provided is a power management device including a monitoring unit configured to monitor power usage statuses of a plurality of sites individually, a determination unit configured to determine whether to supply the surplus power to a second site of the plurality of sites when the monitoring unit detects that surplus power is generated in a first site of the plurality of sites in accordance with a prediction of a power transmission loss between the first site and the second site, and a site control unit configured to instruct the first site to supply the surplus power to the second site when the determination unit determines that the surplus power is supplied to the second site.

Effects of the Invention

According to the disclosed technique, a technique enabling effective use of surplus power generated in a site including a power generation unit is provided.

DESCRIPTION OF EMBODIMENTS

Hereinafter, embodiments of the present disclosure will be described with reference to the drawings. The embodiments to be described below are merely exemplary, and embodiments to which the present invention is applied are not limited to the following embodiments.

Configuration Example of Base

Figure 1:
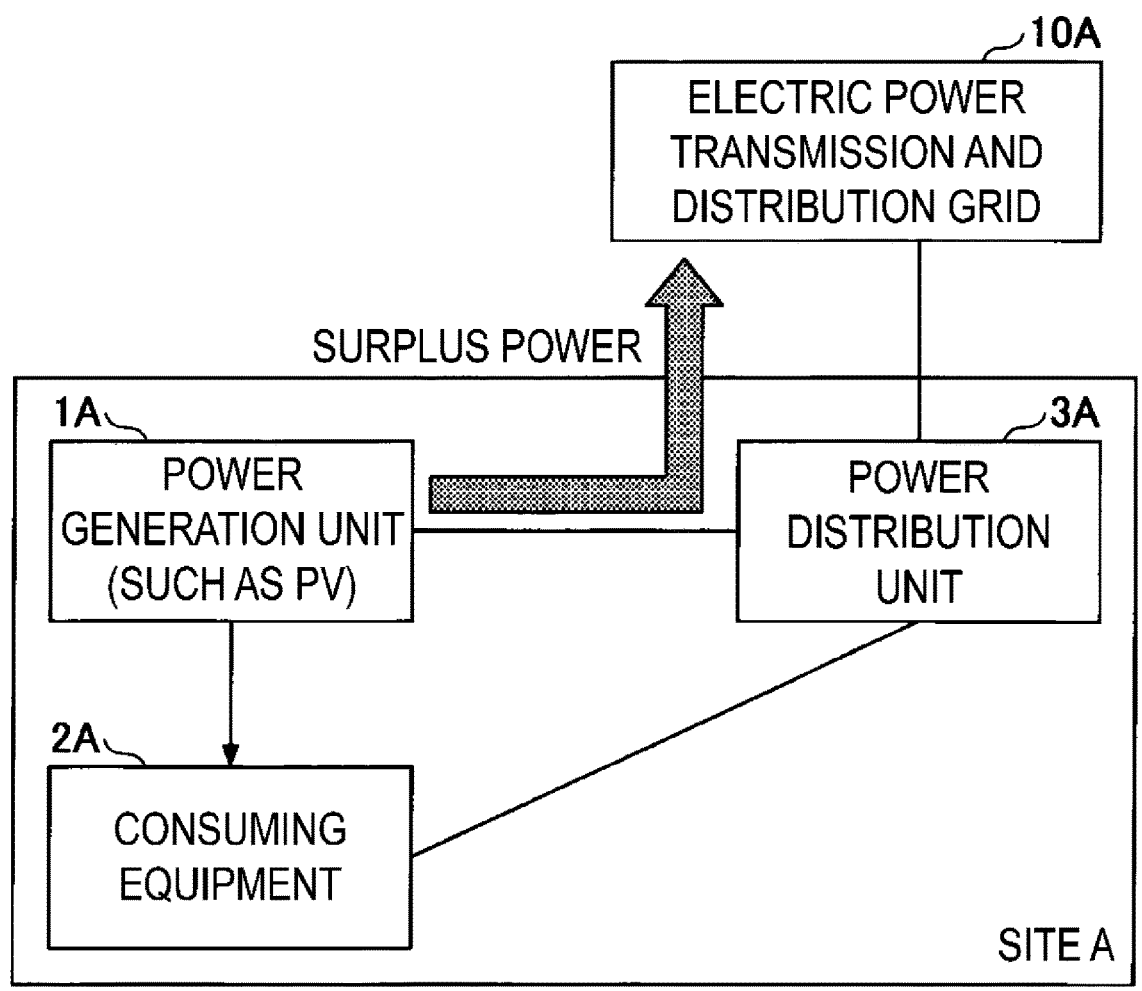
FIG. 1 is a diagram illustrating return of surplus power to a system due to a reverse power flow.

FIG. 1 illustrates a configuration example of a site (site A) in the present embodiment. The "site" in the present embodiment is assumed to be a building such as a telecommunication building or a data center, but such an assumption is an example. The "site" may be a narrower area than a building (for example, one floor or one room) or may be a wider area than a building (for example, a building cluster, a town, a city, a prefecture, or a district).

As illustrated in FIG. 1, the site A includes a power generation unit 1A that generates power with sunlight or the like, a consuming equipment 2A as a load that consumes power, and a power distribution unit 3A connected to an electric power transmission and distribution grid 10A provided by a power company or the like.

The power distribution unit 3A can receive power supplied from the electric power transmission and distribution grid 10A and supply the received power to the consuming equipment 2A. When the power generated by the power generation unit 1A is larger than the power consumed by the consuming equipment 2A, as illustrated in FIG. 1, the power distribution unit 3A can also return surplus power to the electric power transmission and distribution grid 10A. Returning the surplus power to the electric power transmission and distribution grid 10A may be referred to as a "reverse power flow".

Figure 2:
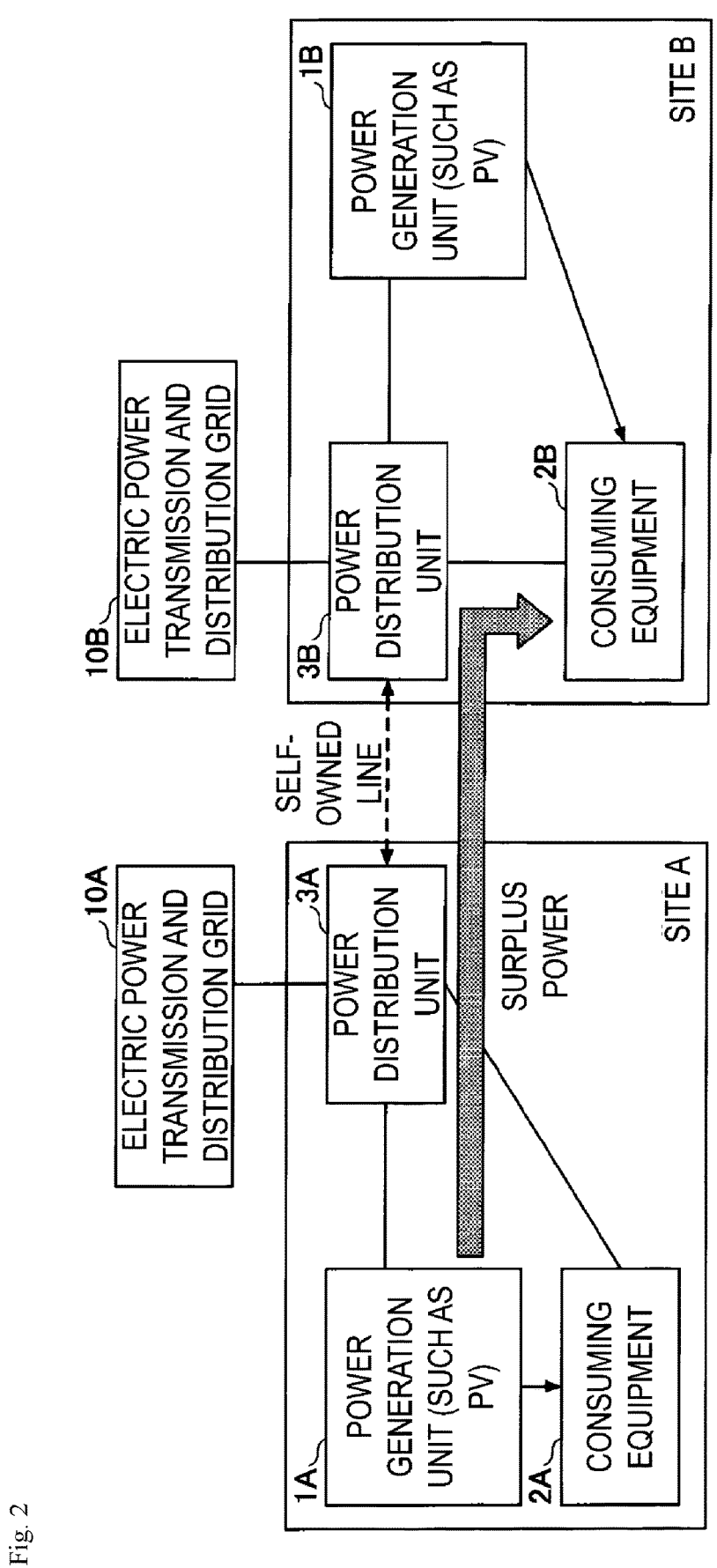
FIG. 2 is a diagram illustrating interchange of the surplus power to another site by a self-owned line.

FIG. 2 is a diagram illustrating an example of a configuration in which the site A and a site B are connected by a self-owned line. The self-owned line is not a cable drawn by an electric power company but a cable drawn by a private company or the like. However, the cable connecting the site A and the site B is not limited to the self-owned line and may be any cable. The site B illustrated in FIG. 2 has a configuration similar to that of the site A.

When the power generated by the power generation unit 1A is larger than the power consumed by the consuming equipment 2A in the site A, the power can be supplied from the site A to the site B via the self-owned line, as illustrated in FIG. 2. Supplying power from the site A to the site B via the self-owned line may be referred to as "interchanging" power.

When the surplus power is transmitted to the electric power transmission and distribution grid (system), the surplus power may not be effectively utilized depending on the state of the electric power transmission and distribution grid. For example, when the amount of power generation increases in the entire area to which the system belongs due to the characteristics of natural energy such as sunlight, the surplus power is not effectively utilized.

In addition, in order to effectively utilize the surplus power, as illustrated in FIG. 2, it is conceivable to supply the surplus power from a certain site to another site on a self-owned line. Because a power transmission loss occurs in proportion to the power transmission distance, the power may be reduced due to power transmission loss depending on the distance and the amount of current and it may not be possible to effectively use the transmitted power on the remote site.

Examples 1 to 3 will be described below as a technique for solving the above problems.

Example 1

Overall Configuration

Figure 3:
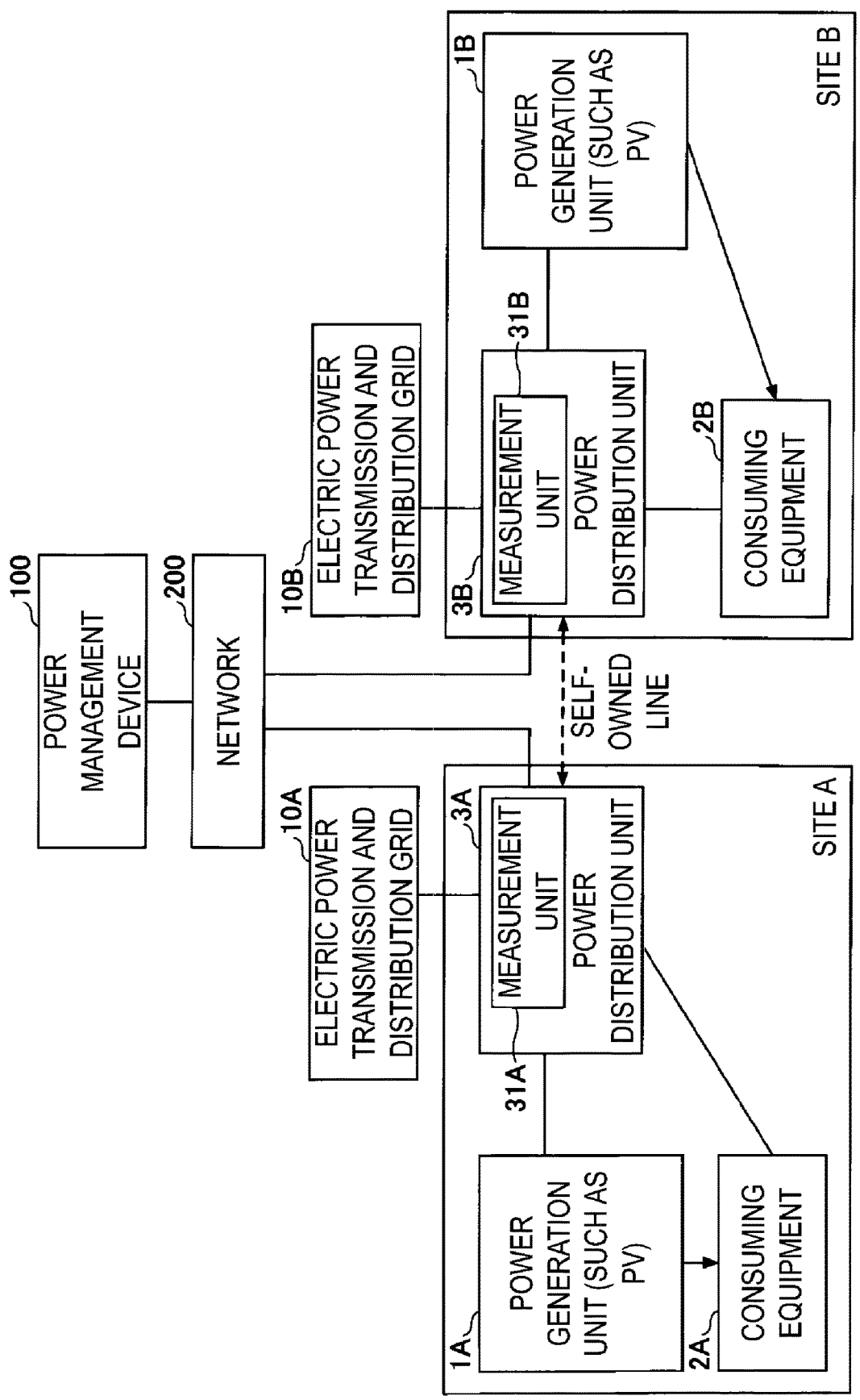
FIG. 3 is a diagram illustrating an overall configuration of a system in Example 1.

FIG. 3 illustrates an overall configuration example of a system according to Example 1. As illustrated in FIG. 3, in the present system, a site A and a site B are connected by a self-owned line. Each configuration of the site A and the site B is similar to the configuration illustrated in FIG. 2. With the self-owned line, the surplus power of the site A can be transmitted to the site B, or the surplus power of the site B can be transmitted to the site A. In Example 1 (description will be similarly applied to Example 2), a case where the surplus power of the site A is transmitted to the site B will be described as an example.

As illustrated in FIG. 3, a power management device 100 is provided. In Example 1, a power distribution unit 3A of the site A includes a measurement unit 31A including a voltmeter, an ammeter, an electric energy meter. The power distribution unit 3A including the measurement unit 31A is communicably connected to the power management device 100 via a network 200. Similarly, in the site B, a power distribution unit 3B includes a measurement unit 31B including a voltmeter, an ammeter, an electric energy meter, and the power distribution unit 3B including the measurement unit 31B is communicably connected to the power management device 100 via the network 200.

FIG. 3 illustrates the site A and site B as sites. There are actually more sites, and each site is connected to the power management device 100. In the example illustrated in FIG. 3, the power management device 100 is provided outside the site A and the site B, but the power management device 100 may be provided in any site (for example, the site A). Furthermore, there may be a site that does not include the power generation unit.

The power management device 100 determines whether surplus power is generated and whether power shortage has occurred, in each site, based on information on a power usage status transmitted from the measurement unit 31 of each site. Then, the power management device controls power interchange based on the determination result. Details are as follows.

When power is transmitted to the site B at a certain distance (about several km) away from the site A on the self-owned line, a power transmission loss occurs in proportion to the power transmission distance. Due to such a loss, the receivable power of the site B may be significantly reduced, and thus it is not possible to effectively use the power of the site A, in the site B.

Therefore, in order to prevent an occurrence of a situation in which the surplus power is wasted due to the power loss, the power management device 100 predicts the power transmission loss based on the power transmission distance (length of the cable) from the site A to the site B (the site A and the site B are connected by the self-owned line), the resistance of the cable, the current amount, and the like. When it is determined that the power transmission is not effective, the power management device instructs the power distribution unit 3A of the site A not to transmit the surplus power from the site A. The meaning of the power transmission not being effective is, for example, that the receivable power of the site B is equal to or smaller than a threshold value (for example, 0 kW).

When the site A does not transmit the surplus power, the power management device 100 returns the surplus power to the electric power transmission and distribution grid 10A, for example. The site B in which power shortage has occurred, for example, power stored in a power storage unit is used.

That is, the power management device 100 predicts, in advance, that the power transmission loss changes depending on the power transmission distance and determines whether the power interchange is performed between a plurality of sites or the power supply is covered in the site. In this manner, it is possible to realize the optimal power use with high utilization efficiency.

Configuration of Apparatus

Figure 4:
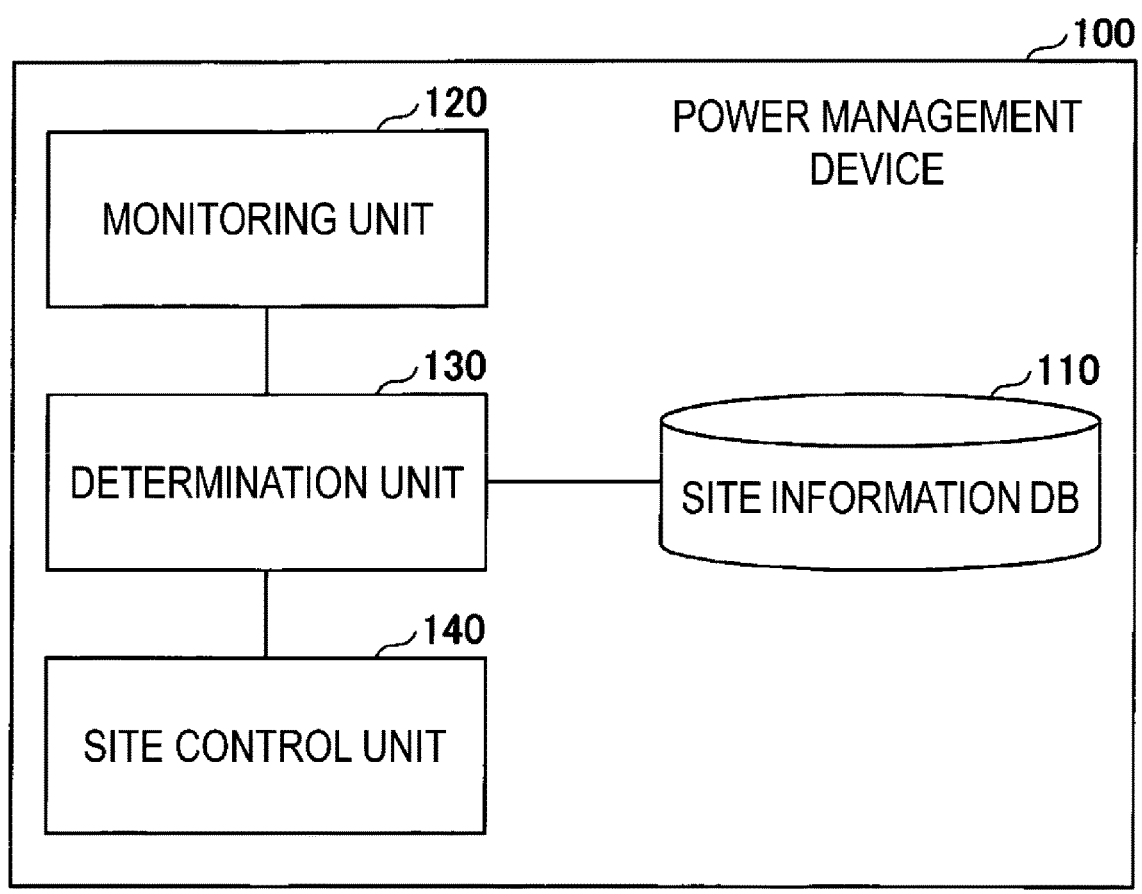
FIG. 4 is a diagram illustrating a functional configuration of a power management device.

FIG. 4 is a diagram illustrating a functional configuration of the power management device 100. As illustrated in FIG.

4, the power management device 100 includes a site information database (DB) 110, a monitoring unit 120, a determination unit 130, and a site control unit 140.

Here, an object that is physically stretched as a self-owned line is referred to as a cable. A conductor that passes electricity included in the cable is referred to as an electric wire. The number of electric wires included in the cable is referred to as the number of threads. That is, the number of threads of the cable means the number of wires included in the cable.

The site information DB 110 (which may also be referred to as a storage unit) stores, as site information, a length of a cable stretched between sites, a diameter of an electric wire constituting the cable, the number of threads of the cable, and the like, for each site. The length of the cable which is stretched between the sites and is used in predicting the power transmission loss may be the distance between the sites. The length of the cable which is stretched between the sites and is used in predicting the power transmission loss may be represented by a movement distance between the sites.

The monitoring unit 120 monitors the power usage status in each site. For example, the monitoring unit 120 receives, for each site, the amount of power generation, the amount of power consumption, the amount of power supplied from the electric power transmission and distribution grid (or returned to the electric power transmission and distribution grid), or the like, which are measured by the measurement unit 31 of the site, as the power usage status. Then, the monitoring unit regularly checks, for each site, whether the surplus power is generated, or whether power shortage has occurred (for example, whether consumption is possible only by the power generation unit without using the commercial power source).

The determination unit 130 calculates the power transmission loss between the target sites based on information acquired from the site information DB 110 and determines whether power transmission of the surplus power to another site is performed, based on the power transmission loss and the surplus power.

The site control unit 140 performs control (for example, instruction to transmit surplus power to another site) on a site (for example, site on which power transmission of the surplus power to another site is performed) as a control target based on the determination result by the determination unit 130.

Hardware Configuration Example

The power management device 100 can be implemented by causing a computer to execute a program describing details of processing as described in the embodiment, for example. The "computer" may be a virtual machine on a cloud. When a virtual machine is used, "hardware" described here is virtual hardware.

The program can be recorded on a computer-readable recording medium (a portable memory or the like) to be stored or distributed. The program can also be provided via a network such as the Internet or an electronic mail.

Figure 5:
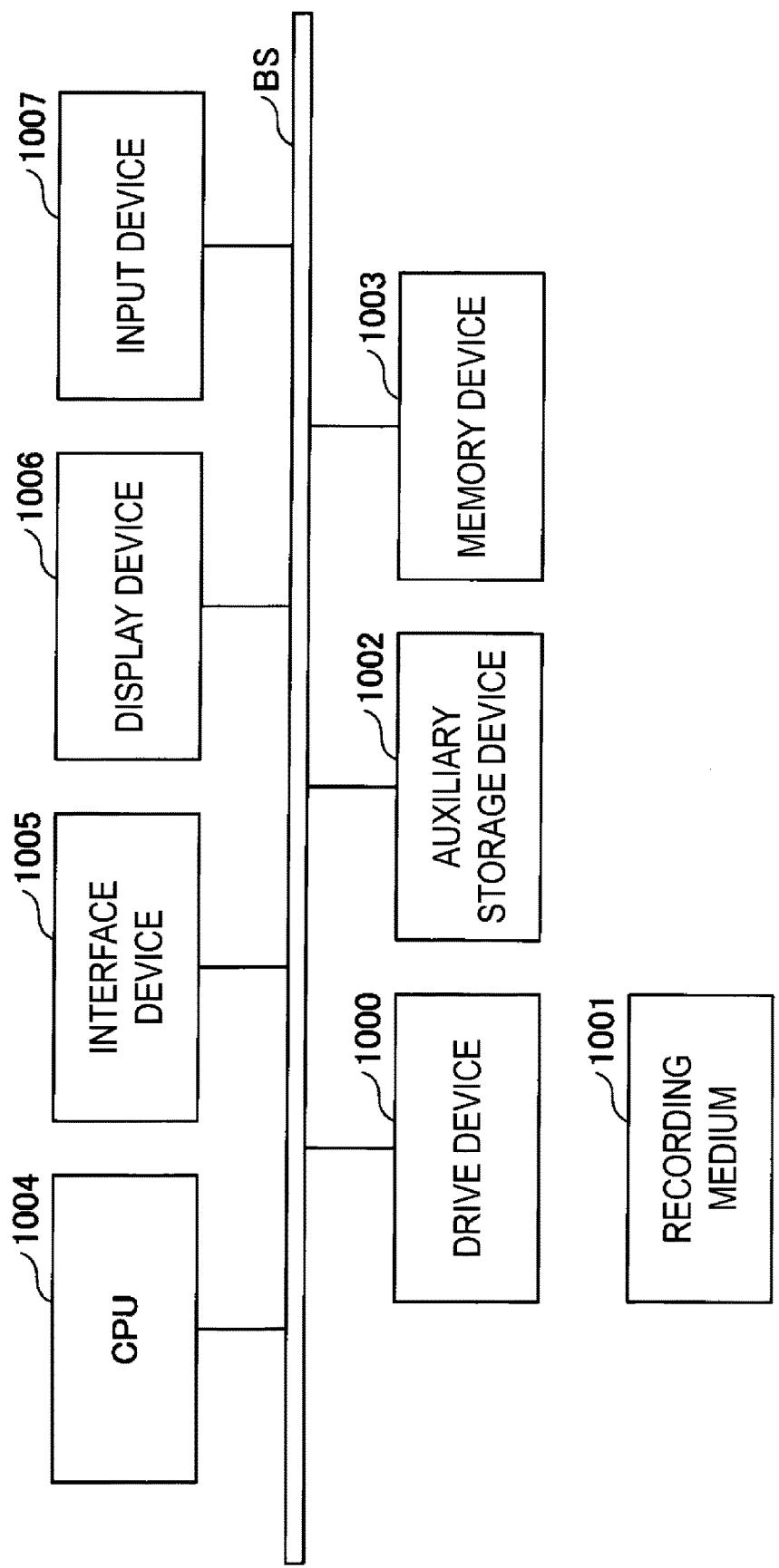
FIG. 5 is a diagram illustrating a hardware configuration example of the power management device.

FIG. 5 is a diagram illustrating a hardware configuration example of the computer described above. The computer in FIG. 5 includes a drive device 1000, an auxiliary storage device 1002, a memory device 1003, a CPU 1004, an interface device 1005, a display device 1006, an input device 1007, and the like which are connected to each other through a bus BS.

A program for implementing processing in the computer is provided by, for example, a recording medium 1001 such as a CD-ROM or a memory card. When the recording medium 1001 that stores a program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores necessary files, data, and the like.

The memory device 1003 reads the program from the auxiliary storage device 1002 and stores the program in a case where an instruction to start the program is given. The CPU 1004 performs functions related to the power management device 100 in accordance with the program stored in the memory device 1003. The interface device 1005 is used as an interface for connection to a network. The display device 1006 displays a graphical user interface (GUI) or the like according to a program. The input device 1007 is constituted by a keyboard, a mouse, buttons, a touch panel, or the like, and is used to input various operation instructions.

Operation Example of Power Management Device 100

Figure 6:
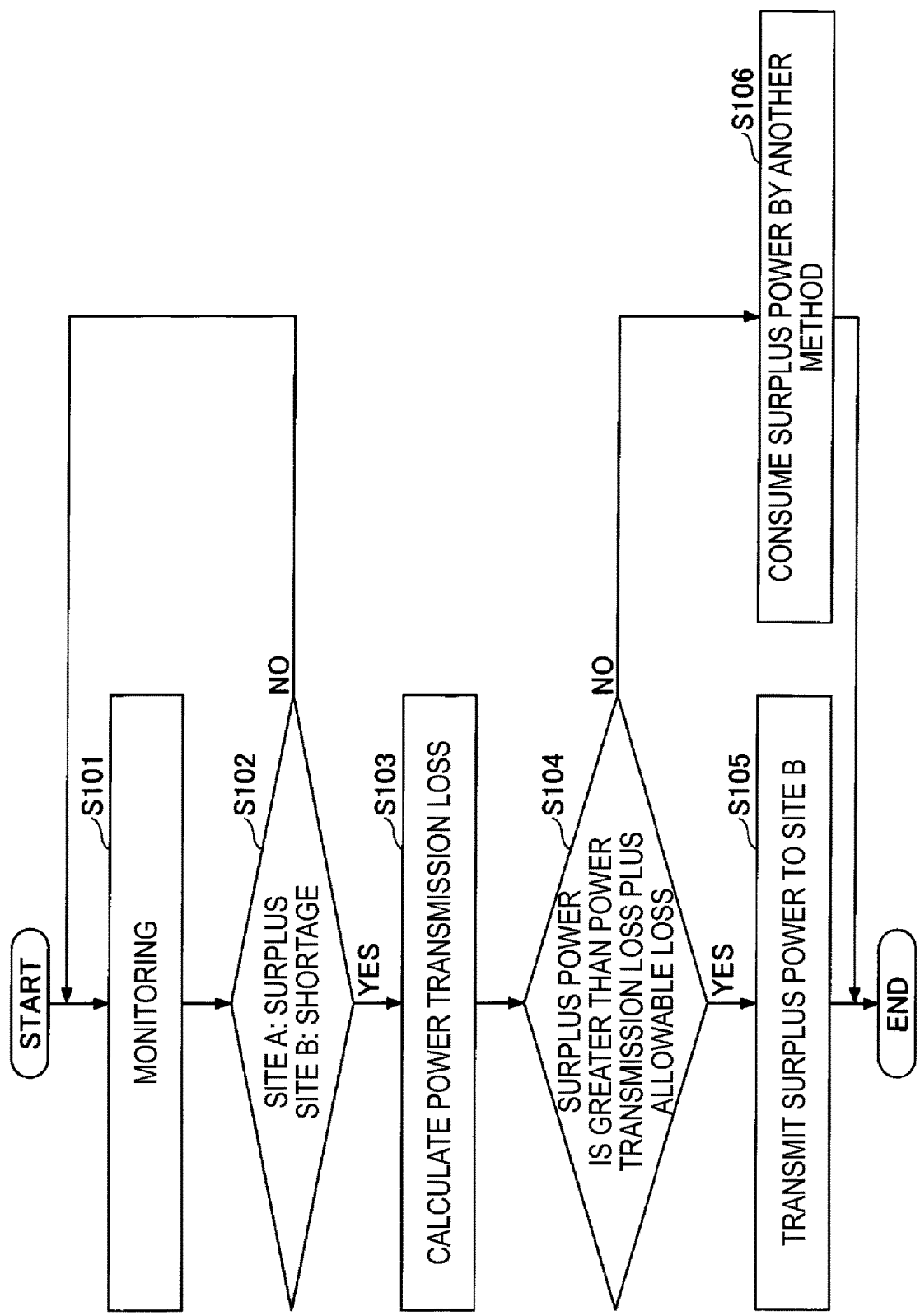
FIG. 6 is a flowchart illustrating an operation of the power management device in Example 1.

Next, an operation example of the power management device 100 having the configuration illustrated in FIGS. 3 and 4 will be described with reference to the flowchart of FIG. 6. Here, for convenience, the operations focusing on power transmission of surplus power from the site A to the site B will be described. The similar operation is performed on the power transmission of surplus power from the site B to the site A.

In S101, the monitoring unit 120 monitors the power usage status of each of the site A and the site B. In S102, the monitoring unit 120 determines whether surplus power is generated in the site A and power shortage has occurred in the site B. Considering a case where three or more sites are provided, the operation here corresponds to determination as to whether "there is a site in which surplus power is generated and there is a site in which power shortage has occurred". The operation after S103 in which S102 is Yes is an example in which the site in which the surplus power is generated is the site A and the site in which the power shortage has occurred is the site B.

It may not be determined whether there is the site in which the power shortage has occurred. For example, when surplus power is generated in a certain site, effectiveness of power transmission of surplus power to the site B is necessarily determined. When power transmission is determined if the power transmission of surplus power is effective, it is not necessary to determine whether the power shortage has occurred.

Here, that surplus power is generated in the site A means, for example, that, when power generated by the power generation unit 1A is set as P1A and power consumed by the consuming equipment 2A is set as P2A, "P2A<P1A" is established.

That the power shortage has occurred in the site B means, for example, that, when power generated by the power generation unit 1B is set as P1B, power consumed by the consuming equipment 2B is set as P2B, and a predetermined threshold value is set as TH (TH≥0), "P1B+TH<P2B" is established. TH is a predetermined value indicating how much power from the commercial power source is used.

When the determination in S102 is Yes, the process proceeds to S103. When the determination is No, the process returns to S101 to continue monitoring.

In S103, the determination unit 130 acquires the length of the cable stretched between the target sites, the diameter of the electric wire constituting the cable, and the number of threads of the cable from the site information DB 110. Then, the determination unit calculates the power transmission loss when the surplus power is transmitted from the site A to the site B, based on the above pieces of information. Specifically, the determination unit 130 calculates the resistance value R of the cable between the site A and the site B in Equation (1) and calculates the power transmission loss $P_L$ in Equation (2).

$$R = \rho \times (2L/n\pi r^2) \qquad \text{Equation (1)}$$

$$P_L = I^2 R \qquad \text{Equation (1)}$$

In Equation (1), ρ is the electrical resistivity of the conductor. L is the length of the cable. n is the number of threads of the cable. r is the radius of each electric wire constituting the cable. In Equation (2), I is a current value. The I may be a value obtained from the site A by the monitoring unit 120 as a current value of the power generation unit 1A of the site A or may be a previous record value.

In S104, the determination unit 104 determines the effectiveness of power transmission of the surplus power from the site A to the site B. Specifically, the determination unit determines whether "surplus power>power transmission loss+allowable loss". When the allowable loss is set as K, "surplus power≤power transmission loss+allowable loss" is established, and surplus power is transmitted to the site B, this means that power received by the site B is equal to or smaller than K (kW). K may be 0.

When the determination result in S104 is Yes (power transmission is effective), the process proceeds to S105. When the determination result is No (power transmission is not effective), the process proceeds to S106.

In S105, the site control unit 140 instructs the site A (specifically, for example, power distribution unit 1A) to transmit surplus power to the site B. The power distribution unit 1A transmits the surplus power to the site B in response to the instruction. The site B supplies the power supplied from the site A to the consuming equipment 2B.

In S106, the site control unit 140 instructs the site A (specifically, for example, power distribution unit 3A) not to transmit the surplus power to the site B. Furthermore, the site control unit 140 instructs the site A (power distribution unit 3A) to return (that is, sell) the surplus power to the electric power transmission and distribution grid 10A. The power selling is an example of a method of consuming the surplus power when the surplus power is not transmitted to the site B.

In the example described above, when the surplus power is generated in the site A, but the power shortage does not occur in the site B, in S102, the process may proceed to S106.

In the example described above, the determination unit 130 calculates the power transmission loss as a theoretical value, but this is an example. For example, the site information DB 110 may store measured values of the voltage and current in the previous power transmission for each site. The determination unit 130 may read the voltage and current in the previous power transmission from the site information DB 110 and calculate the power transmission loss by the voltage×current. The determination unit 130 may correct the theoretical values calculated in Equations (1) and (2) described above by using the measured values of the previous voltage and current read from the site information DB 110.

In the example described above, the peer-to-peer case of the site A and the site B has been described, but this is an example. Even with a configuration in which a plurality of sites are connected in a plurality of paths (routes) such as a microgrid, it is possible to determine whether surplus power can be transmitted in the similar manner to that in the example described above.

For example, it is assumed that sites A, B, C, and D are connected in a power grid such as a microgrid, and each site is capable of transmitting power to another site on a plurality of routes. In this case, for example, when the power management device 100 detects that surplus power is generated in the site A, and power shortage has occurred in the site C, the power management device 100 determines a route having the minimum power transmission loss among a plurality of routes from the site A to the site C and determines the effectiveness of transmitting surplus power on the determined route. When power transmission is effective on this route, the power management device 100 instructs the site A to perform power transmission by using the determined route.

Example 2

Figure 7:
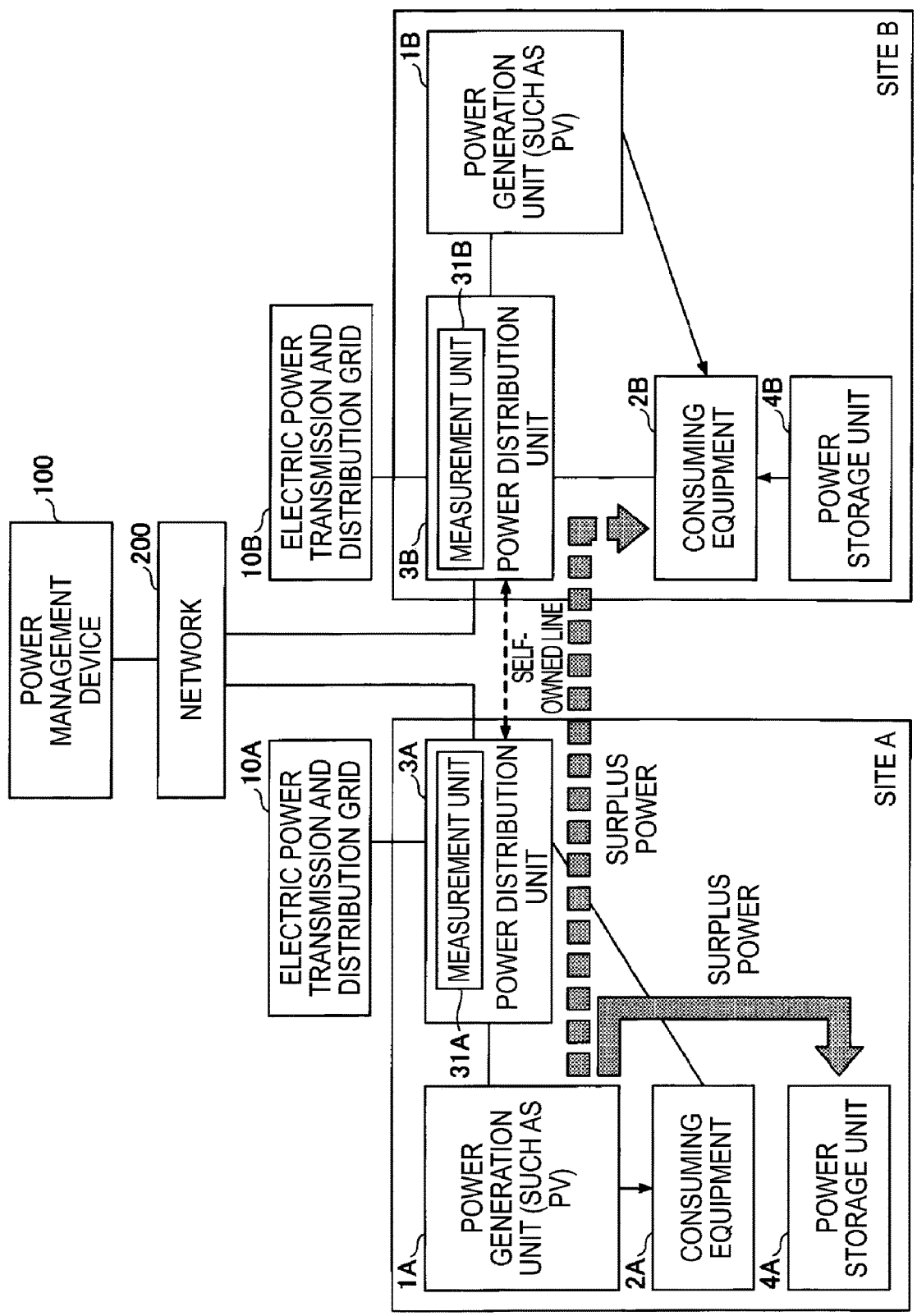
FIG. 7 is a diagram illustrating an overall configuration of a system in Example 2.

Next, Example 2 will be described. FIG. 7 is a diagram illustrating a system configuration in Example 2. As illustrated in FIG. 7, the configuration in Example 2 is different from the configuration (FIG. 3) in Example 1 in that a power storage unit 4 is provided in each site. Except for this point, the configuration in Example 2 is the same as the configuration in Example 1.

In Example 2, when power transmission is not effective by the determination based on the power transmission loss, and thus surplus power is not transmitted from the site A, a power management device 100 effectively utilizes the power by not returning the surplus power to the electric power transmission and distribution grid 10A, but storing the surplus power in the power storage unit 4A including a storage battery.

In Example 2, the power management device 100 may transmit power from the site A to the site B and use the power for storing of a power storage unit 4B in a case where it is determined that the amount of stored power in the power storage unit 4B of the site B is insufficient even though power shortage does not occur in the consuming equipment 2B of the site B when surplus power is generated in the site A.

In addition, in the site B, when the power shortage has occurred in the consuming equipment 2B, and it is not possible to receive power from the site A due to the power transmission loss, the power in the power storage unit 4B may be used.

Figure 8:
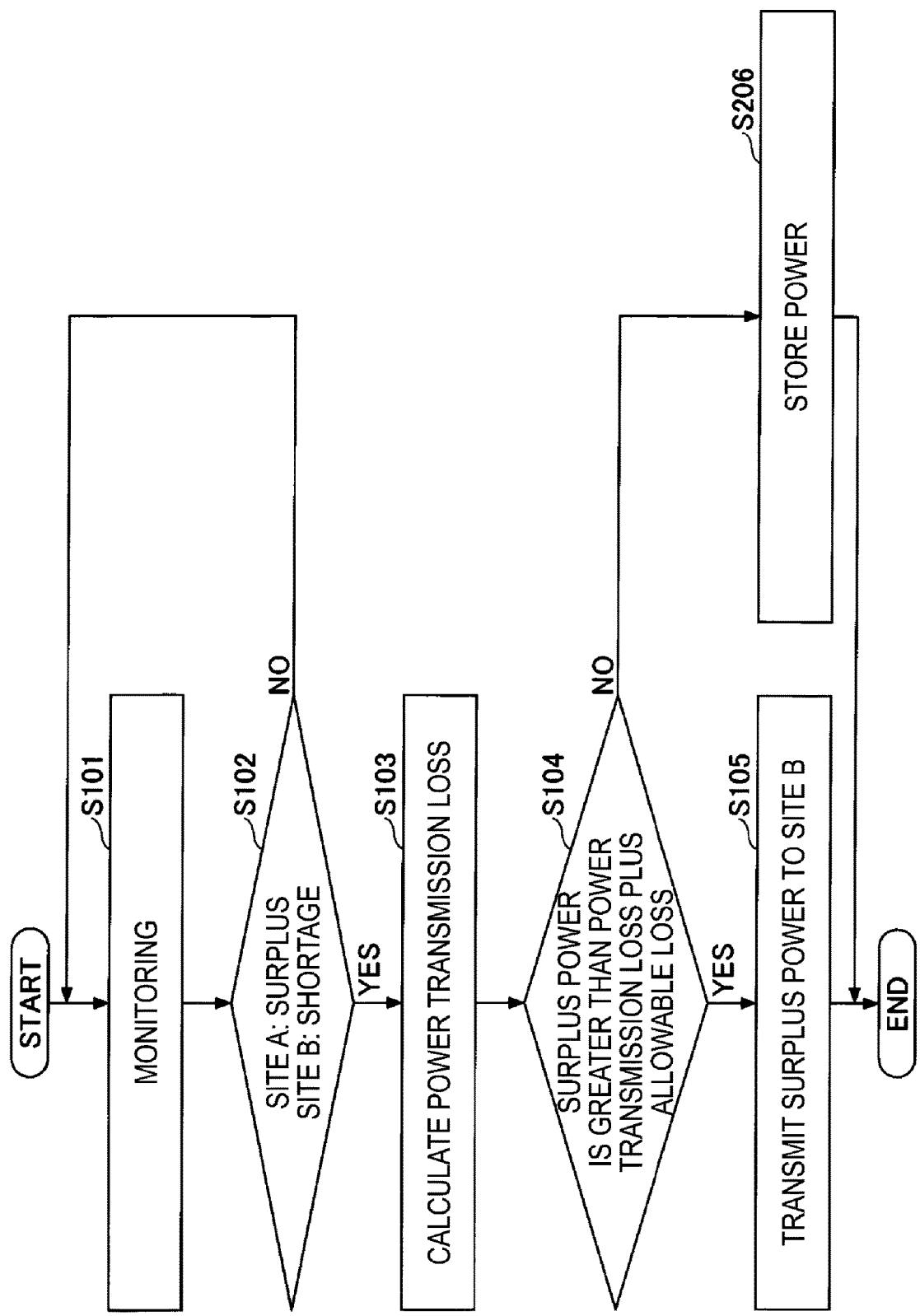
FIG. 8 is a flowchart illustrating an operation of the power management device in Example 2.

FIG. 8 is a flowchart illustrating an operation of the power management device 100 in Example 2. The differences from the flow in Example 1 are mainly described.

S101 to S104 are the same as S101 to S104 in Example 1. S105 is also the same as S105 in Example 1.

When the determination unit 130 determines that the power transmission of the surplus power is not effective in S104 (No in S104), the process proceeds to S206, and the site control unit 140 instructs the power distribution unit 3A of the site A to store the surplus power in the power storage unit 4A.

At this time, in the site B, the surplus power from the site A is not received. Thus, the power from the power storage unit 4B is supplied to the consuming equipment 2B. The operation of supplying the power from the power storage unit 4B in the site B to the consuming equipment 2B may be autonomously performed by the site B or may be performed based on an instruction from the site control unit 140 of the power management device 100.

As described above, switching between power transmission of surplus power to the site B and power storing in the power storage unit 4A by the determination based on the power transmission loss in S104 is an example. In addition to this operation, for example, the determination unit 130 may distribute the surplus power to power transmission to the site B and power storing in the power storage unit 4A of the site A, based on the power transmission loss calculated in S103.

For example, when the "surplus power−(power transmission loss+allowable loss)" is larger than a predetermined threshold value S, the determination unit 130 determines that the surplus power is distributed to power transmission to the site B and power storing in the power storage unit 4A of the site A. Then, the site control unit 140 instructs the site A to distribute the surplus power to the power transmission to the site B and the power storing in the power storage unit 4A of the site A.

As an example, when the surplus power is set as P, $\alpha \times P$ is transmitted, and $\beta \times P$ is stored. It is necessary to satisfy "$\alpha \times P$>power transmission loss+allowable loss". Here, $\alpha+\beta=1$ ($\alpha>0$, $\beta>0$), and $\alpha$ and $\beta$ may be fixed values or may be determined from the insufficient amount of power in the site B and the insufficient amount of power in the site A.

Example 3

Next, Example 3 will be described. In Example 3, an example of control related to power interchange in a configuration in which three or more sites are connected in a power grid will be described. In Example 3, each site is connected to a power management device 100 via a network 200, and the power management device 100 monitors the power usage status in each site. The power management device 100 is capable of performing the control described in Examples 1 and 2 between any sites.

Examples 3-1 to 3-4 will be described below as specific examples of Example 3. In Examples 3-1 to 3-4 below, basically, a method for minimizing the power transmission loss when the power management device 100 detects that there is surplus power in the site A and power shortage has occurred in the site C will be described.

Example 3-1

Figure 9:
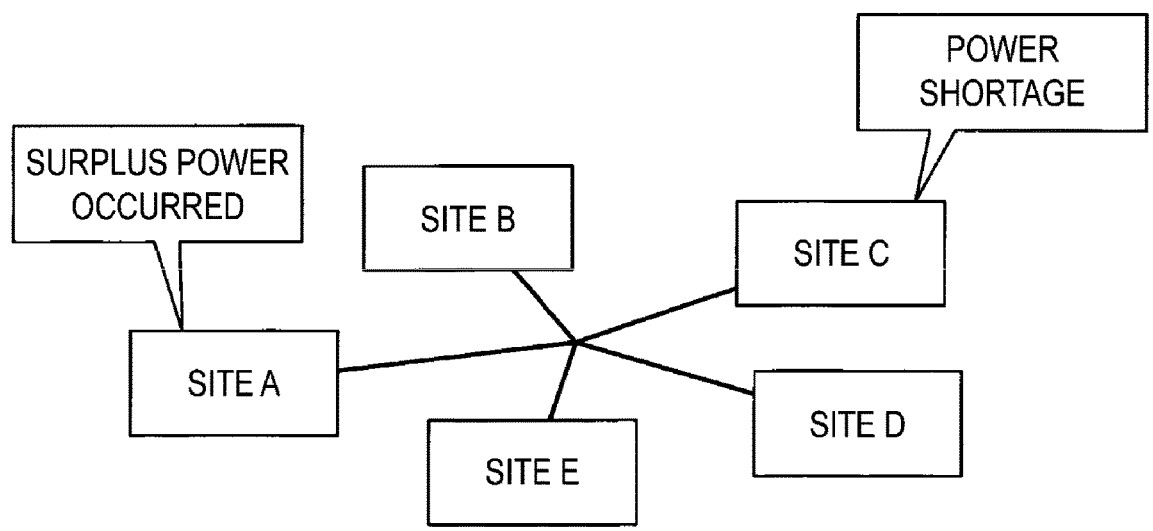
FIG. 9 is a diagram illustrating a configuration of Example 3-1.

FIG. 9 is a diagram illustrating a connection configuration of sites in Example 3-1. As illustrated in FIG. 9, in Example 3-1, sites A to D are connected to each other in a star type.

When the power management device 100 detects that there is surplus power in the site A and the power shortage has occurred in the site C, the power management device 100 instructs the site A to transmit the surplus power to the site C based on the determination of the power transmission effectiveness. The site A transmits the surplus power to the site C in response to the instruction. In the site C, power obtained by subtracting the power transmission loss from the power transmitted from the site A is used.

When the power management device 100 detects a plurality of "sites having surplus power" and detects that the power shortage has occurred in the site C, the power management device 100 instructs each of the plurality of sites to transmit the surplus power to the site C. Thus, it is possible to reduce the power transmission loss in each site. A power transmission ratio of the surplus power between the plurality of sites is set to be, for example, the inverse ratio of the power transmission loss.

For example, when the plurality of sites are the site A and the site B, it is assumed that the power transmission loss between the site A and the site C is 1 and the power transmission loss between the site B and the site C is 2. In this case, when the power transmitted from the site A to the site C is 1, the power transmitted from the site B to the site C is 1/2.

When the power management device 100 detects a plurality of "sites in which power shortage has occurred" and detects that surplus power is generated in the site A, the power management device 100 instructs the site A to transmit the surplus power to the plurality of sites in which the power shortage has occurred. For transmission power to the site, it is necessary to satisfy "transmission power>(power transmission loss+allowable loss)". For example, when there is a site that does not satisfy "transmission power>(power transmission loss+allowable loss)", power is not transmitted to this site. Here, a value obtained by summing "transmission power" per site that performs power transmission by the number of sites that performs power transmission is surplus power of the site A.

Example 3-2

Figure 10:
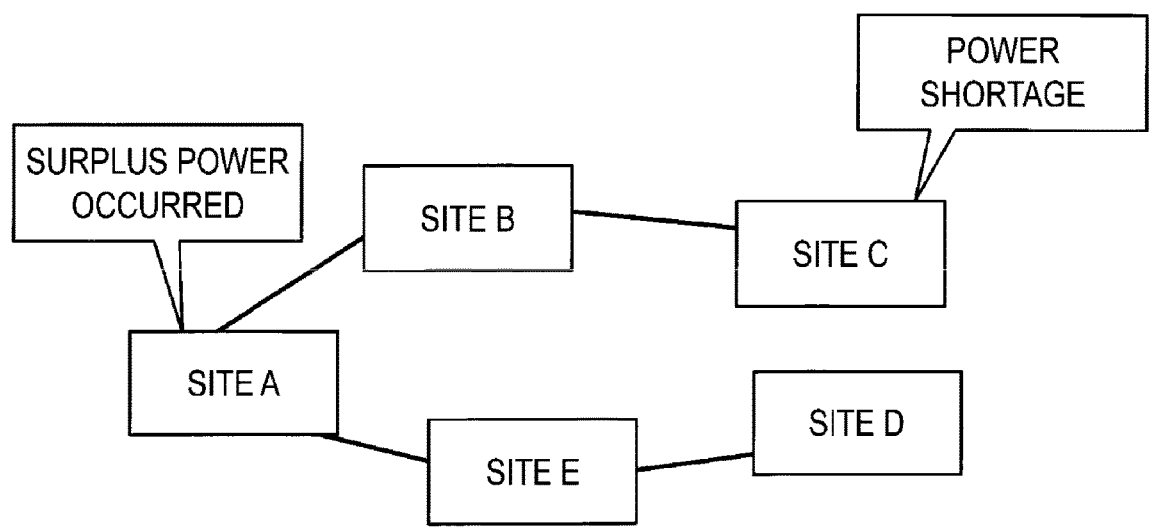
FIG. 10 is a diagram illustrating a configuration of Example 3-2.

FIG. 10 is a diagram illustrating a connection configuration of sites in Example 3-2. As illustrated in FIG. 10, in Example 3-2, sites A to D are connected to each other in a bus type.

When the power management device 100 detects that there is surplus power in the site A and the power shortage has occurred in the site C, the power management device 100 instructs the site A to transmit the surplus power to the site C based on the determination of the power transmission effectiveness. The site A transmits the surplus power to the site C in response to the instruction. In the site C, power obtained by subtracting the power transmission loss from the power transmitted from the site A is used.

When the power management device 100 detects a plurality of "sites having surplus power" and detects that the power shortage has occurred in the site C, the power management device 100 instructs the site having a smaller power transmission loss (such as a short cable length and a thick electric wire diameter) among the plurality of sites, for example, to preferentially transmit the surplus power to the site C.

For example, when the plurality of sites are the site A and the site B, it is assumed that the power transmission loss between the site A and the site C is 2 and the power transmission loss between the site B and the site C is 1. In this case, the power management device 100 instructs the site B to transmit the surplus power. When it is not possible to cover the shortage of the site C only by the power transmitted from the site B, the power management device 100 further instructs the site A to transmit the surplus power.

When the power management device 100 detects a plurality of "sites in which power shortage has occurred" and detects that surplus power is generated in the site A, the power management device 100 instructs the site A to preferentially transmit the surplus power to the site having a smaller power transmission loss among the plurality of sites in which the power shortage has occurred.

For example, when sites in which the power shortage has occurred are set to the site B and the site C, and the power transmission loss of the site B is smaller than that of the site C, the power management device 100 instructs the site A to transmit the surplus power to the site B. When there is the surplus power even though the power is transmitted to the site B, the power management device 100 instructs the site A to further transmit the surplus power to the site C.

Example 3-3

Figure 11:
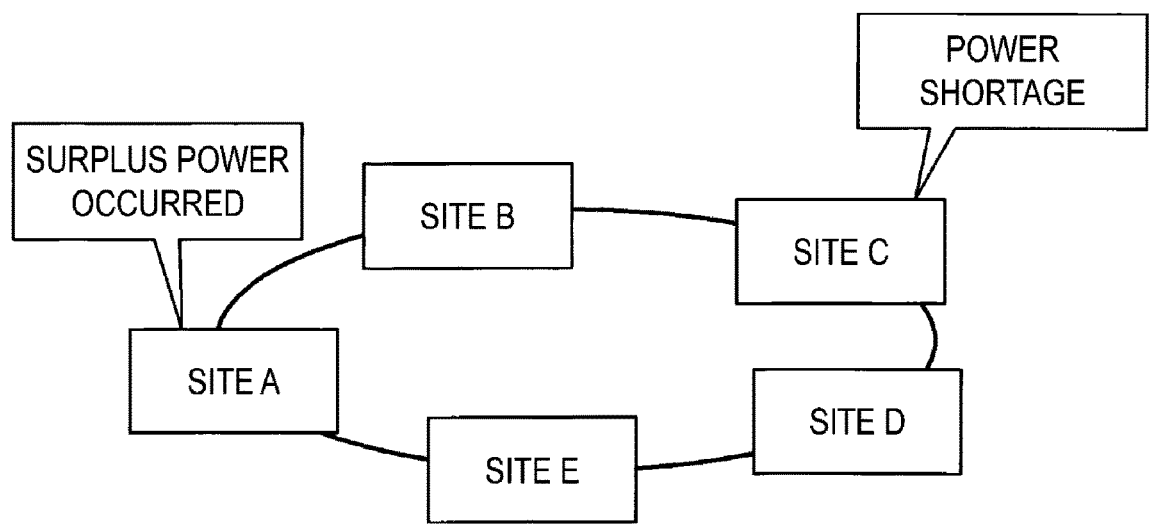
FIG. 11 is a diagram illustrating a configuration of Example 3-3.

FIG. 11 is a diagram illustrating a connection configuration of sites in Example 3-3. As illustrated in FIG. 11, in Example 3-3, sites A to D are connected to each other in a ring type.

When the power management device 100 detects that there is surplus power in the site A and the power shortage has occurred in the site C, the power management device 100 instructs the site A to transmit the surplus power to the site C on a route having a smaller power transmission loss based on the determination of the power transmission effectiveness. The site A transmits the surplus power to the site C in response to the instruction. In the site C, power obtained by subtracting the power transmission loss from the power transmitted from the site A is used. In the example of FIG. 11, for example, when a route via the site B is set to have a smaller power transmission loss than a route via the site E, the power management device 100 instructs the site A to transmit the surplus power to the site C on the route via the site B.

When the power management device 100 detects a plurality of "sites having surplus power" and detects that the power shortage has occurred in the site C, the power management device 100 instructs the site connected to the site C on the route having a smaller power transmission loss having a smaller power transmission loss (such as a short cable length and a thick electric wire diameter) among the plurality of sites, for example, to preferentially transmit the surplus power to the site C.

For example, when the plurality of sites are the site A and the site B, it is assumed that the minimum power transmission loss between the site A and the site C is 2 and the minimum power transmission loss between the site B and the site C is 1. In this case, the power management device 100 instructs the site B to transmit the surplus power on the route having the smaller power transmission loss. When it is not possible to cover the shortage of the site C only by the power transmitted from the site B, the power management device 100 further instructs the site A to transmit the surplus power.

When the power management device 100 detects a plurality of "sites in which power shortage has occurred" and detects that surplus power is generated in the site A, the power management device 100 instructs the site A to preferentially transmit the surplus power to the site connected on the route having the smaller power transmission loss among the plurality of sites in which the power shortage has occurred.

For example, when sites in which the power shortage has occurred are set to the site B and the site C, and the power transmission loss of the site B is smaller than that of the site C, the power management device 100 instructs the site A to transmit the surplus power to the site B on the route having the smaller power transmission loss. When there is still the surplus power even though the power is transmitted to the site B, the power management device 100 instructs the site A to the transmit the surplus power further to the site C.

Example 3-4

Figure 12:
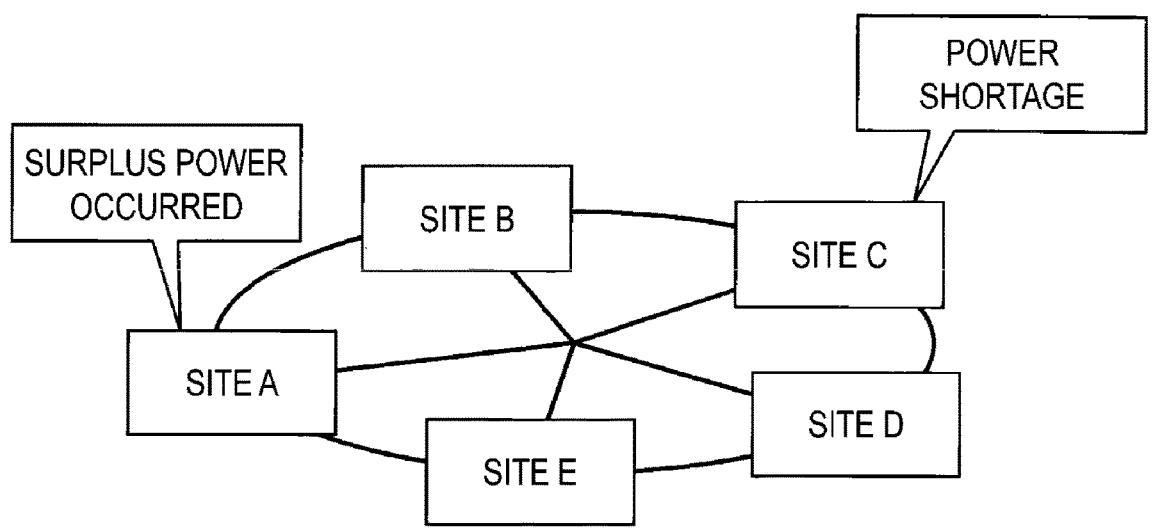
FIG. 12 is a diagram illustrating a configuration of Example 3-4.

FIG. 12 is a diagram illustrating a connection configuration of sites in Example 3-4. As illustrated in FIG. 12, in Example 3-4, sites A to D are connected to each other in a mesh type. The power transmission control of the surplus power is similar to that in Example 3-1. Furthermore, in Example 3-4, the power transmission control of the surplus power may be performed in the similar manner to that in Example 3-3.

Effects of Embodiment and Supplement

Hitherto, as described above, according to the present embodiment, the technique for enabling effective use of surplus power generated in a site including the power generation unit is provided.

In this specification, at least a power management device, a power management method, and a program described in the following items.

Item 1

A power management device comprising:
 a monitoring unit configured to monitor power usage statuses of a plurality of sites individually;
 a determination unit configured to determine, when the monitoring unit detects that surplus power is generated in a first site of the plurality of sites, whether to supply the surplus power to a second site of the plurality of sites in accordance with a prediction of a power transmission loss between the first site and the second site; and
 a site control unit configured to instruct, when the determination unit determines that the surplus power is to be supplied to the second site, the first site to supply the surplus power to the second site.

Item 2

The power management device according to item 1, wherein
 in accordance with the surplus power and the power transmission loss, the determination unit determines to supply the surplus power to the second site when the determination unit determines that power to be received in the second site is greater than a threshold value and determines to store the surplus power in a power storage unit provided in the first site when the determination unit determines that the power to be received in the second site is equal to or smaller than the threshold value.

Item 3

The power management device according to item 1 or 2, wherein
 the determination unit calculates the power transmission loss as a theoretical value based on information on a cable between the first site and the second site.

Item 4

The power management device according to item 1 or 2, wherein
 the determination unit estimates the power transmission loss from a previous record of a current and a voltage between the first site and the second site.

Item 5

The power management device according to any one of items 1 to 4, wherein
 the determination unit determines to supply a portion of the surplus power to the second site and store a remaining portion of the surplus power in the power storage unit provided in the first site in accordance with the power transmission loss.

Item 6

The power management device according to any one of items 1 to 5, wherein
 when a plurality of power transmission routes are provided from the first site to the second site, the determination unit determines whether to supply the surplus power to the second site in accordance with a power transmission loss in a power transmission route of the plurality of power transmission routes in which the power transmission loss is minimized.

Item 7

A power management method performed by a power management device, the power management method comprising:

monitoring power usage statuses of a plurality of sites individually;

by the monitoring, when generation of surplus power is detected in a first site of the plurality of sites, determining whether the surplus power is supplied to a second site of the plurality of sites in accordance with a prediction of a power transmission loss between the first site and the second site; and by the determining, when supply of the surplus power is supplied to the second site is determined, instructing the first site to supply the surplus power to the second site.

Item 8

A program causing a computer to operate as an individual unit of the power management device according to any one of items 1 to 6.

Although the present embodiment has been described above, the present invention is not limited to such a specific embodiment, and various modifications and changes can be made within the scope of the gist of the present invention described in the claims.

REFERENCE SIGNS LIST

1 Power generation unit
2 Consuming equipment
3 Power distribution unit
10 Electric power transmission and distribution grid
31 Measurement unit
100 Power management device
110 Base information DB
120 Monitoring unit
130 Determination unit
140 Base control unit
200 Network
1000 Drive device
1001 Recording medium
1002 Auxiliary storage device
1003 Memory device
1004 CPU
1005 Interface device
1006 Display device
1007 Input device

The invention claimed is:

1. A power management device comprising one or more processors configured to perform operations comprising:
monitoring power usage statuses of a plurality of sites individually;
detecting that surplus power is generated in a first site of the plurality of sites;
calculating a power transmission loss from the first site to a second site that is included in the plurality of sites;
determining an amount of to-be-received power at the second site using the surplus power minus the power transmission loss;
determining whether to supply the surplus power to the second site based on whether the amount of to-be-received power at the second site satisfies a threshold value; and
in response to determining that the amount of to-be-received power satisfies the threshold value, determining to supply the surplus power to the second site, and instructing the first site to supply the surplus power to the second site.

2. The power management device according to claim 1, wherein the operations further comprise:
in response to determining that the amount of to-be-received power in the second site is equal to or smaller than the threshold value, determining to store the surplus power in a power storage unit provided in the first site.

3. The power management device according to claim 1, wherein the operations comprise:
calculating the power transmission loss as a theoretical value based on information on a cable between the first site and the second site.

4. The power management device according to claim 1, wherein the operations comprise:
estimating the power transmission loss from a previous record of a current and a voltage between the first site and the second site.

5. The power management device according to claim 1, wherein the operations comprise:
determining to supply a portion of the surplus power to the second site and store a remaining portion of the surplus power in a power storage unit provided in the first site in accordance with the power transmission loss.

6. The power management device according to claim 1, wherein the operations comprise:
when a plurality of power transmission routes are provided from the first site to the second site, determining whether to supply the surplus power to the second site in accordance with a power transmission loss in a power transmission route of the plurality of power transmission routes in which the power transmission loss is minimized.

7. A power management method performed by a power management device, the power management method comprising:
monitoring power usage statuses of a plurality of sites individually;
detecting that surplus power is generated in a first site of the plurality of sites;
calculating a power transmission loss from the first site to a second site that is included in the plurality of sites;
determining an amount of to-be-received power at the second site using the surplus power minus the power transmission loss;
determining whether to supply the surplus power to the second site based on whether the amount of to-be-received power at the second site satisfies a threshold value; and
in response to the determining that the amount of to-be-received power satisfies the threshold value, determining to supply the surplus power to the second site and instructing the first site to supply the surplus power to the second site.

8. A non-transitory, computer-readable medium storing one or more instructions executable by a computer system to perform operations by a power management device comprising:
monitoring power usage statuses of a plurality of sites individually;
detecting that surplus power is generated in a first site of the plurality of sites;

calculating a power transmission loss from the first site to a second site that is included in the plurality of sites;

determining an amount of to-be-received power at the second site using the surplus power minus the power transmission loss;

determining whether to supply the surplus power to the second site based on whether the amount of to-be-received power at the second site satisfies a threshold value; and in response to the determining that the amount of to-be-received power satisfies the threshold value, determining to supply the surplus power to the second site and instructing the first site to supply the surplus power to the second site.

* * * * *